United States Patent
Nieminen

(10) Patent No.: US 10,309,106 B2
(45) Date of Patent: Jun. 4, 2019

(54) INSULATION TILE AND METHOD FOR ITS MANUFACTURE

(71) Applicant: FINNFOAM OY, Salo (FI)

(72) Inventor: Henri Nieminen, Salo (FI)

(73) Assignee: FINNFOAM OY, Salo (FI)

(*) Notice: Subject to any disclaimer, the term of this patent is extended or adjusted under 35 U.S.C. 154(b) by 0 days.

(21) Appl. No.: 15/846,448

(22) Filed: Dec. 19, 2017

(65) Prior Publication Data

US 2018/0171633 A1    Jun. 21, 2018

(30) Foreign Application Priority Data

Dec. 20, 2016    (FI) ..................................... 20165992

(51) Int. Cl.
*E04C 1/40* (2006.01)
*E04C 2/52* (2006.01)
(Continued)

(52) U.S. Cl.
CPC ................ *E04C 2/523* (2013.01); *B32B 3/30* (2013.01); *B32B 5/18* (2013.01); *B32B 13/045* (2013.01); *B32B 13/12* (2013.01); *E04B 1/80* (2013.01); *E04C 2/288* (2013.01); *E04F 13/0875* (2013.01); *E04F 13/141* (2013.01); *E04F 15/087* (2013.01); *E04F 15/181* (2013.01);
(Continued)

(58) Field of Classification Search
CPC . E04C 2/523; E04C 1/40; B32B 13/12; B32B 13/045
See application file for complete search history.

(56) References Cited

U.S. PATENT DOCUMENTS

| | | | | |
|---|---|---|---|---|
| 4,916,004 A | * | 4/1990 | Ensminger | .......... B28B 23/0006 428/113 |
| 6,387,309 B1 | * | 5/2002 | Kojima | .................. B21D 37/20 264/139 |

(Continued)

FOREIGN PATENT DOCUMENTS

| | | |
|---|---|---|
| DE | 4433161 A1 | 3/1996 |
| WO | 03035729 A2 | 5/2003 |

(Continued)

OTHER PUBLICATIONS

Finnish Patent Office, Search Report of the Finnish patent application No. 20165992 dated Jul. 13, 2017.
(Continued)

*Primary Examiner* — Patrick J Maestri
(74) *Attorney, Agent, or Firm* — Berggren LLP

(57) ABSTRACT

The insulation tile comprises a first planar surface, a second planar surface and side surfaces defining the surfaces, and a casting compound layer as well as an insulation material layer, which is manufactured from thermal insulation material, the compression strength of which is at least 10 kPa. The casting compound layer forms the first planar surface of the insulation tile and the insulation material layer forms the second planar surface of the insulation tile. Furthermore, the insulation material layer of the insulation tile comprises grooves in the area of the planar surface which will be against the casting compound layer. The insulation tile according to the invention can be used in floor, roof and wall structures.

12 Claims, 2 Drawing Sheets

Figure 1:
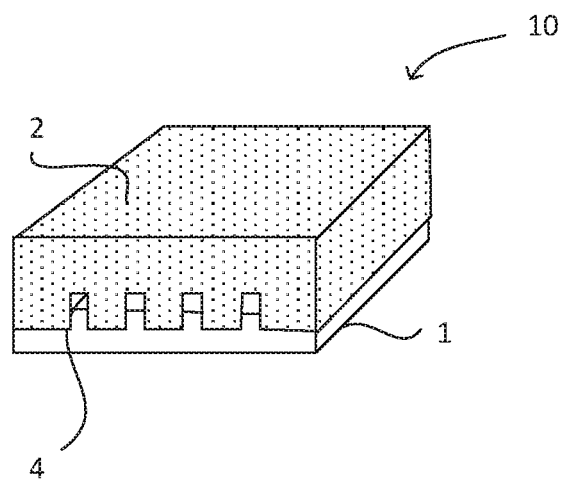

(51) Int. Cl.
    *E04C 2/288*     (2006.01)
    *B32B 3/30*     (2006.01)
    *B32B 5/18*     (2006.01)
    *B32B 13/04*     (2006.01)
    *B32B 13/12*     (2006.01)
    *E04F 13/08*     (2006.01)
    *E04F 13/14*     (2006.01)
    *E04B 1/80*     (2006.01)
    *E04F 15/08*     (2006.01)
    *E04F 15/18*     (2006.01)
    *E04F 15/10*     (2006.01)
    *E04D 3/34*     (2006.01)
    *E04F 13/077*     (2006.01)

(52) U.S. Cl.
    CPC ... *B32B 2250/02* (2013.01); *B32B 2266/0214* (2013.01); *B32B 2305/70* (2013.01); *B32B 2307/304* (2013.01); *B32B 2419/04* (2013.01); *E04D 3/34* (2013.01); *E04F 13/077* (2013.01); *E04F 15/107* (2013.01); *E04F 2203/04* (2013.01)

(56) References Cited

U.S. PATENT DOCUMENTS

| | | |
|---|---|---|
| 9,260,864 B2 | 2/2016 | Cole et al. |
| 2003/0003271 A1* | 1/2003 | Bykov .............. B32B 3/12 428/139 |
| 2013/0102727 A1 | 4/2013 | LeBlanc |

FOREIGN PATENT DOCUMENTS

| | | |
|---|---|---|
| WO | 2010135626 A2 | 11/2010 |
| WO | 2013152048 A1 | 10/2013 |
| WO | 2015147738 A1 | 10/2015 |

OTHER PUBLICATIONS

European Patent Office, Search Report dated May 18, 2018, The Hague.

* cited by examiner

INSULATION TILE AND METHOD FOR ITS MANUFACTURE

PRIORITY

This application claims priority of Finnish national application 20165992 filed on Dec. 20, 2016 the contents of which is incorporated herein by reference.

FIELD OF THE INVENTION

The invention relates to an insulation tile according to the appended independent claims and the use of insulation tiles in floor, roof and wall structures. The invention also relates to a method for manufacturing the insulation tile.

BACKGROUND OF THE INVENTION

The problem of the floor, roof and wall structures, which comprise insulation material layers and casting compound layers, is often especially the condensation of moisture in the structures. As a result of the moisture, the insulation materials can become waterlogged and the structures can thus be damaged.

SUMMARY OF THE INVENTION

The object of the present invention is to provide an insulation tile, which can be used in wall, floor and roof structures. The object of the invention is thus also to introduce the use of the insulation tiles.

The object of the invention is to introduce an insulation tile, the structure of which enables to provide a ventilation to the structure in an easy and simple manner.

The object of the invention is further to provide an insulation tile, which enables a quick and easy assembly of the wall, floor and roof structures.

To attain this purpose, the insulation tile, the use of the insulation tile and the method for manufacturing the insulation tile according to the invention is primarily characterised in what is presented in the characterising parts of the appended independent claims.

Some preferred embodiments of the invention are disclosed in the other, dependent claims. The features and advantages of the invention disclosed in this application text relate to the insulation tile as well as its use and manufacturing method, even though it is not always specifically mentioned.

The insulation tile according to the invention comprises parallel first planar surface and second planar surface and side surfaces defining the surfaces. Typically, the side surfaces are substantially perpendicular to the planar surfaces. A typical insulation tile according to the invention also comprises
  a casting compound layer, and
  an insulation material layer, which is made of thermal insulation material, the compression strength of which is at least 10 kPa,
wherein the casting compound layer forms a first planar surface of the insulation tile and the insulation material layer forms a second planar surface of the insulation tile, and which insulation material layer comprises grooves in the area of the planar surface which will be against the casting compound layer and the casting compound layer extends partly to these grooves in the surface of the insulation material layer, wherein a gap remains to the grooves in the surface of the insulation material layer between the insulation material layer and the casting compound layer.

In a typical method according to the invention for manufacturing an insulation tile according to the invention
  casting compound is fed to the casting mould,
  an insulation material layer is applied to the casting mould on the casting compound, which insulation material layer is formed of at least one plate, the compression strength of which plate is at least 10 kPa, and which insulation material layer comprises grooves in the area of the planar surface which will be against the casting compound layer.
  the insulation material layer is pressed against the casting compound, whereby the casting compound is evenly spread to the casting mould thereby forming a planar surface of the insulation tile, and the casting compound partly fills the grooves on the surface of the insulation material, which grooves set against the casting compound, whereby a gap remains to the grooves in the surface of the insulation material layer between the insulation material layer and the casting compound layer.

The insulation tile according to the invention may also be called as an insulation board, which comprises a casting compound layer and an insulation material layer as defined in the present application.

The insulation tile according to the invention is based on the fact that it enables ventilation gaps to the structure, when the insulation tiles are used to form a structure, such as a wall, roof or floor structure. Inside the insulation tile structure according to the invention, the second planar surfaces of the insulation material layer and the casting compound layer are against each other. The insulation material layer of the insulation tile according to the invention comprises grooves in the area of the planar surface which will be against the casting compound layer, in this way, ventilation gaps can be formed inside the insulation tile so that there is a gap in the grooves in the surface of the insulation material layer between the insulation material layer and the casting compound layer. Typically, the planar surface of the insulation material layer which will be against the casting compound layer comprises grooves in the longitudinal and/or in the lateral direction of the surface in the area of the entire planar surface, in a preferred embodiment in the longitudinal and in the lateral direction in the area of the entire planar surface. In an embodiment of the invention, ventilation gaps can be additionally formed to the structure formed of insulation tiles between the insulation tiles with the aid of a substantially longitudinal groove of the side surface on at least one side surface, when the insulation tiles are installed to the structure with the side surfaces against each other.

The insulation tile according to the invention can be used in wall, floor and roof structures. Typically, the planar surface formed by the casting compound layer of the insulation tile forms the outer surface of the structure formed of the insulation tiles in the site of use of the insulation tile. In these structures, the insulation tiles according to the invention are arranged next to each other so that the side surfaces of the insulation tiles arranged against each other and the planar surface formed by the casting compound layer of the insulation tile typically forms the outer surface of the structure formed of insulation tiles. The surface formed by the casing compound layer can further be coated by a coating suitable for the purpose. The wall, roof or floor structure thus comprises a layer formed of the insulation tiles according to the invention and possibly a separate coating layer on the surface of the casting compound layer of the insulation tiles.

In a floor structure, the grooves inside the insulation tile according to the invention and the possible grooves on the side surface of the insulation tile act as a ventilation groove for moisture and/or as a ventilation groove for radon gases or corresponding toxic gases, to which ventilation groove a gravitational or mechanical underpressure can be connected for enhancing the ventilation. The insulation tiles according to the invention to be installed to the floor may be fixed for example with mortar directly on the old concrete slab. The mortar may dry with the aid of the air changing in the grooves, and this way the tiles may be coated also with a very tight coating without any concern. The coating layer of the floor may be fixed directly on the surface of the casting compound layer of the insulation tiles.

The insulation tile according to the invention is useful especially in the floor structures of cold spaces, such as cold stores. In a ground floor of cold stores, the flow direction of water vapour is from outside to the inside, and the grooves in the insulation tile according to the invention between the insulation material layer and the casting compound layer, and the groove possibly on at least one side surface of the tiles, enables the exit of water vapour and therefore the water vapour cannot condense in the structure.

The insulation tiles according to the invention can be used in roof structures, in a conventional roof structure as well as in a reversed roof structure. In the reversed roof structure, the waterproofing layer is under the thermal insulation, whereas in the conventional roof structure the waterproofing layer is above the thermal insulation. The grooves in the insulation tile according to the invention between the insulation material layer and the casting compound layer enable also in this structure the exit of water vapour from the structure. In the reversed roof structure, it is possible to remove rain water through the grooves on the side surfaces of the insulation tiles, when the joints between the tiles of the insulation layers under the grooves are sealed with silicone, butyl paste or with a corresponding casting compound. This way, puddles cannot be formed on the surface of the tiles and rain water cannot damage the insulation material in the structure of the insulation tile. The insulation tile according to the invention further enables the coating of the insulation tiles in a reversed roof structure, whereby a separate coating layer can be fastened directly on the surface of the casting compound layer of the insulation tiles. The insulation tile according to the invention enables for example coating of the roof structure directly with bitumen, which in other circumstances is not possible on the surface of the insulation material, but now the casting compound layer protects the insulation material and it is not damaged as a result of the bitumen installation work. Thus, the insulation tile according to the invention simplifies and accelerates the construction of the reversed roof structure.

Also in the wall structures, the grooves in the insulation tile between the insulation material layer and the casting compound layer function as ventilation gaps of the structure. In the outer wall structures, the grooves arranged on the side surfaces of the insulation tiles according to an embodiment of the invention also function as a so-called draining layer, i.e. if rain water may get from the surface of the surface tile behind it, there is a ready-made groove space in the structure for removing the water. The thermal insulation to be used in the tiles must naturally be almost waterproof.

The insulation material to be used in the insulation tile can be any insulation material suitable for the purpose and having a sufficient compression strength. The compression strength of the thermal insulation material to be used should be at least 10 kPa (according to standard EN 826), more typically at least 30 kPa, most typically the compression strength of the thermal insulation material is in the range of 60-500 kPa. According to a preferred embodiment the thermal insulation material is extruded polystyrene (XPS), expanded polystyrene (EPS), polyurethane (PIR/PUR) or phenolic foam. In a preferred embodiment of the invention extruded polystyrene (XPS) is used in the insulation tile as a thermal insulation material, the closed cell structure of which guarantees a waterproof structure.

In an embodiment of the invention the insulation material layer is formed of thermal insulation material, which comprises 1-80 weight-%, preferably 1-50 weight-% recycled XPS, EPS, polyurethane (PIR/PUR) or phenolic foam material or recycled rubber granules. The recycled material can be for example granules or pieces having a diameter, which is typically about 1-10 mm, most typically 1-5 mm.

The insulation material layer of the insulation tile according to the invention can be formed of one or more plates. The insulation material layer of the insulation tile according to a preferred embodiment of the invention is formed of one plate, such as of a plate manufactured from extruded polystyrene, expanded polystyrene, polyurethane or phenolic foam.

The insulation material plates to be used in the manufacture of the insulation tile are grooved at least on their one planar surface so that the planar surface of the insulation material layer which will be against the casting compound layer has grooves in the longitudinal and/or lateral direction of the surface, preferably in the longitudinal as well as in the lateral direction in the area of the planar surface of the entire plate.

In an embodiment the insulation material layer of the insulation tile can be formed of at least one plate, which comprises a first planar surface, a second planar surface and side surfaces defining the surfaces, the at least one side surface of the insulation material layer, which layer is formed by plate or plates, is formed so that the first planar surface which will be against the casting compound layer is smaller than the second planar surface. Then the insulation material plate comprises a first planar surface, a second planar surface and side surfaces defining the surfaces, the at least one side surface of which plate is formed so that the area of the first planar surface which will be against the casting compound layer is smaller than the area of the second planar surface. The insulation material layer can also be manufactured from two or more insulation material plates by arranging the plates tightly against each other before forming the casting compound layer on the surface of the insulation material layer. One or more side surfaces of the insulation material layer formed from a plate or several plates can be formed so that a space is formed in them, to which space the casting compound in the casting mould can spread. In an embodiment the insulation plates comprise a tongue and groove or a similar forming on at least one side surface of the insulation plate, typically on at least two side surfaces. In an embodiment of the invention the insulation plates comprise a tongue and groove or a similar forming on all side surfaces of the insulation plate, in other words the tongue and groove encircles the plate. The tongue and groove on the side surface of the insulation plate is typically a half-groove joint, but it can also be a full-groove joint or a lock-groove joint. According to a preferred embodiment of the invention the casting compound layer extends on the side surfaces of the insulation tile partly on the insulation material layer, whereby the insulation material layer partly remains inside the casting compound layer. This way, the structure of the insulation tile according to the invention has been made stronger.

In an embodiment of the invention the planar surface of the insulation material layer which will be against the casting compound layer comprises grooves, but the side surfaces of the insulation tile are even, without grooves. In a preferred embodiment the insulation tile comprises a groove substantially in the longitudinal direction of the side surface on at least one side surface and the insulation material layer comprises grooves in the area of the planar surface which will be against the casting compound layer.

The distance between the grooves (measured from the middle to the middle) on the planar surface of the insulation material layer can vary, typically the distance between the grooves is about 50-150 mm, most typically about 100 mm. The distance between the grooves may also be different in the lateral direction and in the longitudinal direction of the layer. The distance between the grooves can also vary depending on the purpose of use of the insulation tiles. The width of the grooves can also vary depending on the purpose of use of the tiles and thus depending on the properties required from the insulation tile. Typically, the width of the grooves is about 10-50 mm or 10-20 mm. Similarly, the depth of the grooves varies depending on the purposes of use, typically the depth of the grooves is about 10-50 mm.

The casting compound layer of the insulation tile according to the invention is typically formed of concrete, mortar or a similar casting compound, which comprises binding agent and inorganic material and which is suitable to be used in tiles. In a preferred embodiment of the invention the casting compound is concrete or mortar. The concrete or mortar layer can also comprise reinforcing layers, such as reinforcing fibre mat or the like. The fibre mat can be made of glass fibres, carbon fibres or other material having a good tensile strength. The casting compound layer is typically nearly incombustible material, which protects the structures on the surface of the insulation material layer in case of fire.

The casting compound layer can also comprise 1-80 weight-%, preferably 1-50 weight-% recycled XPS, EPS, polyurethane (PIR/PUR) or phenolic foam material or recycled rubber granules in the casting compound. The recycled material can be granules or pieces having a diameter, which is typically about 1-10 mm, most typically 1-5 mm.

In the insulation tile according to the invention, the thickness of the insulation material layer and the casting compound layer can vary depending for example on the purpose of use of the insulation tile. Typically, the thickness of the insulation material layer in the insulation tile is in the range of 50-500 mm, measured between the planar surfaces of the layer. The thickness of the casting compound layer may be in the range of 1-150 mm measured between the planar surface of the insulation material layer and the planar surface of the casting compound layer. Typically, the thickness of the casting compound layer is in the range of 1-20 mm measured between the planar surface of the insulation material layer and the planar surface of the casting compound layer. In some embodiments, the thickness of the casting compound layer may be 40-150 mm. In the insulation tile according to an embodiment of the invention the casting compound layer extends to the grooves in the insulation material layer so that the thickness of the casting compound in the grooves is 2-50 mm or 2-40 mm, more typically 10-30 mm depending on the depth of the grooves, this way, the adhesive strength of the casting compound layer to the insulation material layer can be remarkably improved. For example, when using the insulation tiles in a wall structure, also the strength of the insulation tiles endures better in case of fire thanks to the grooves and the structure becomes thus firmer in case of fire, since the casting compound layer manufactured from almost incombustible material, which casting compound layer penetrates deeper to the insulation material layer in the grooves and protects the structures especially well in case of fire. Typically, the casting compound layer does not entirely fill the grooves in the insulation material layers, but there is a gap in the grooves on the surface of the insulation material layer between the insulation material layer and the casting compound layer, which gap usually functions as a ventilation gap in roof, floor and wall structures formed of insulation tiles.

An insulation tile according to the invention has a groove substantially in the longitudinal direction of the side surface at least on one side surface. The longitudinal direction of the side surface is substantially perpendicular to the thickness of the tile. The thickness of the insulation tile is the distance between the first and the second planar surface of tile. Most typically, in the insulation tile according to the invention the grooves in the substantially longitudinal direction of the side surface of the tile are on the two or more side surfaces of the insulation tile. In a preferred embodiment, there are grooves on all side surfaces of the insulation tile. In the case of a rectangular insulation tile, the grooves are typically arranged on at least two side surfaces, which are substantially parallel. Typically, the insulation tiles are rectangular having four side surfaces, but the shape of the insulation tile according to the invention can vary.

Typically, the groove on the side surface of the insulation tile is formed between the insulation material layer and the casting compound layer. The groove on the side surface of the insulation tile is substantially in the longitudinal direction of the side surface. Typically, the depth of the groove is 20-40 mm, the depth of the groove refers to the depth perpendicular to the side surface of the tile. The width of the groove in the thickness direction of the tile can vary depending on the fact whether it is partly filled with the casting compound in the manufacturing stage.

The insulation tiles according to the invention can be manufactured for example by using a casting mould, which comprises at least a lower surface and side walls defining the surfaces. The casting mould may also comprise an upper surface. The walls define the inner volume of the casting mould. The walls of the casting mould may be movable, whereby the size of the casting mould may be changed. At least one of the walls of the casting mould may be openable. Typically, the upper and/or the lower surface of the casting mould may be arranged movable, so when necessary, compression strength may be directed to the casting mould with it. The manufacture of the insulation tiles in the casting mould enables a manufacture of the tiles simply in one casting stage. The insulation tiles according to the invention can also be manufactured with another method suitable for the purpose.

A typical method according to the invention for manufacturing insulation tiles comprises
  casting compound is fed to the casting mould,
  an insulation material layer is applied to the casting mould on the casting compound, which insulation material layer is manufactured from at least one plate, the compression strength of which plate is at least 10 kPa, and the insulation material layer comprises grooves in the area of the planar surface which will be against the casting compound layer.

the insulation material layer is pressed against the casting compound, whereby the casting compound is evenly spread to the casting mould thereby forming the second planar surface of the insulation tile.

In the casting mould, the casting compound is spread as an even layer between the lower surface of the casting mould and the insulation material layer, when the insulation material layer is pressed against the casting compound. The casting compound also partly fills the possible grooves on the surface of the thermal insulation material, which set against the casting compound, whereby a gap remains to the grooves on the surface of the insulation material layer between the insulation material layer and the casting compound layer. In an embodiment of the invention the casting compound is also spread to the sides of the casting mould thereby partly filling the space between the plate manufactured from the insulation material and the side wall of the casting mould, which space remains between the shaped edge of the plate and the side wall of the mould. This way, the groove on the side surface of the insulation tile according to the invention can be formed in the casting mould and the groove is formed between the insulation material layer and the layer cast from a casting compound, such as concrete. The one edge of the groove is formed by the insulation material layer and the second edge is formed by the casting compound layer. In the mould, the casting compound is evenly spread over the bottom area, and the space remaining between the insulation plate and the inner surface of the side wall of the casting mould is partly filled with a casting compound or alternatively the casting compound does not substantially travel at all to this space depending on the amount of the casting compound fed to the mould. The amount of the casting compound has been calculated so that the space remaining between the thermal insulation plate and the inner surface of the mould is not completely filled with the compound, but the end product has a groove on at least one side surface of the tile.

In an embodiment of the invention the first planar surface of the insulation tile formed by the casting compound layer can comprise a structure, a groove/grooves or other desired forms, which can be easily formed in the casting stage, for example, with a casting mould technique on the surface of the casting compound. The structure enables the use of insulation tiles for example as a coating in the wall structures, whereby the desired pattern is already ready-made in the tile. Alternatively, the planar surface of the tile manufactured from casting compound, such as concrete or similar material, can be even.

The insulation tiles according to the invention can be manufactured in different sizes. The insulation tile according to the invention typically has a rectangular shape. The length of the long edge sides of the rectangular insulation tile is typically 500-2500 mm, and more typically 600-1300 mm. The length of the short edge sides of the insulation tile is typically 300-1200 mm, and more typically 500-800 mm. In a preferred embodiment, the size of the insulation tiles may be 600×600 mm or 600×1200 mm.

The insulation tiles according to the invention can be used in floor structures, for example as a supplementary insulation in old floors by fastening the tiles on the surface of the old floor with mortar. The insulation tile can also be used in roof structures, in conventional roof structures as well as in reversed roof structures. The insulation tiles according to the invention can also be used in wall structures.

SHORT DESCRIPTION OF THE FIGURES

Figure 2:
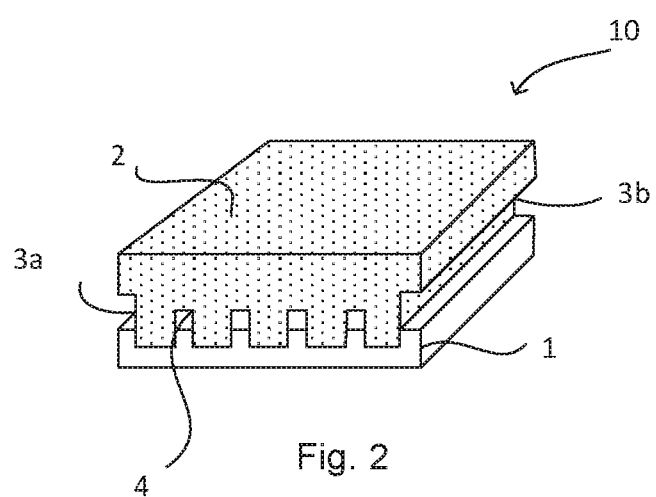
Figure 3:
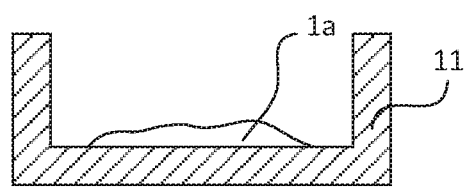
Figure 3:
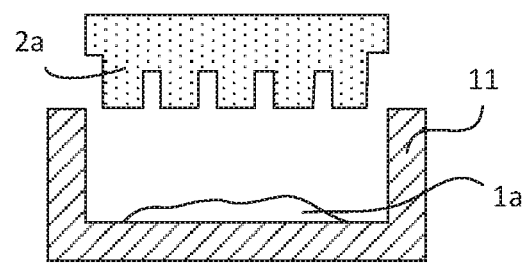
Figure 3:
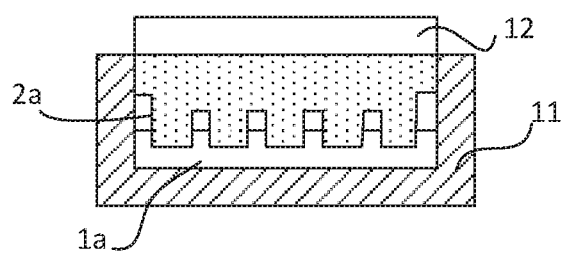

In the following, the invention will be described in more detail with reference to the appended drawings, in which FIG. 1 shows a structure of an insulation tile according to the invention, FIG. 2 shows a structure of another insulation tile according to the invention, and FIG. 3 is a schematic view of a method for manufacturing an insulation tile according to the invention.

DETAILED DESCRIPTION OF THE INVENTION

In the following, the invention is described in more detail with reference to FIGS. 1 and 2, which show structures of insulation tiles according to some embodiments of the invention. FIG. 3 shows schematically a method for manufacturing an insulation tile according to the invention.

FIG. 1 shows a structure of an insulation tile according to the invention. The insulation tile 10 comprises a first planar surface, a second planar surface and side surfaces defining the surfaces, and a casting compound layer 1 and an insulation material layer 2 formed of thermal insulation material. The casting compound layer 1 forms the first planar surface of the insulation tile and the insulation material layer 2 forms the second planar surface of the insulation tile. The insulation material layer 2 of the insulation tile shown in FIG. 1 also comprises grooves on the planar surface of the insulation material layer, which arranges against the casting compound layer 1. The casting compound layer 1 extends to the grooves in the insulation material 2, but however so that ventilation gaps 4 remain between the insulation material layer 2 and the casting compound layer 1. Thus, the casting compound does not entirely fill the grooves in the insulation material.

FIG. 2 shows a structure of another insulation tile 10 according to the invention. The structure is otherwise the same as in FIG. 1, but now there are additionally grooves 3*a*, 3*b* on the side surfaces of the insulation tile between the casting compound layer 1 and the insulation material layer 2. The grooves 3*a*, 3*b* in the insulation tile 10 shown in FIG. 2 are arranged on two side surfaces, which are substantially parallel. In the insulation tile 10 according to the invention, the groove 3*a*, 3*b* can be formed on at least one side surface. According to a preferred embodiment of the invention the casting compound layer 1 extends on the side surfaces of the insulation tile partly on the insulation material layer 2, whereby the insulation material layer 2 partly remains inside the casting compound layer 1. Depending on the structure of the plate forming the insulation material layer 2 and on the amount of the casting compound 1 in the manufacturing stage, the size of the groove/grooves 3*a*, 3*b* may vary and thus also the fact, how big part of the insulation material layer 2 is inside the casting compound layer 1.

In a preferred embodiment of the invention, the casting compound layer 1 of the insulation tile 10 is formed of concrete or mortar, and the insulation material layer 2 is made of a plate manufactured from extruded polystyrene (XPS). The planar surface formed by the casting compound 1 may comprise different structures, grooves or shapes, which are typically formed in the casting stage on the surface of the casting compound layer.

FIG. 3 shows schematically a method for manufacturing the insulation tiles according to the invention. The Figure shows three different stages A-C for manufacturing the insulation tile in a casting mould 11, which comprises a bottom part and side walls. The casting mould may also comprise a cover part 12. Stage A shows the arrangement of the casting compound 1*a* in the casting mould 11, typically on the bottom of the casting mould. After this, in stage B, the at least one plate 2a forming the insulation material layer and manufactured from a thermal insulation material is put in the casting mould, the planar lower surface of which plate comprises grooves and sets against the casting compound layer. Further, the at least one side surface of the lower surface of the plate manufactured from a thermal insulation material, in the case of the Figure two side surfaces, can be notched/formed so that the lower surface of the plate which sets against the casting compound has a smaller area than the upper surface of the plate. Thus, FIG. 3 shows an insulation tile according to the invention, the side surfaces of which insulation tile have grooves. In stage C, the plate 2a is pressed to the casting compound and as a result of this the casting compound 2a is evenly spread on the bottom of the casting mould and partly to the grooves in the thermal insulation material and in some cases also partly to the sides of the casting mould to the space between the thermal insulation plate 2a and the inner wall of the casting mould. After this, the casting mould can be opened, and the insulation tile can be removed from the mould.

The invention is not intended to be limited to the above-presented exemplary embodiments, but the intention is to apply the invention widely within the inventive idea defined by the claims defined below.

The invention claimed is:

1. An insulation tile having a first planar surface, a second planar surface and four side surfaces, the insulation tile consisting of:
   a casting compound layer having a first and a second surface and four side surfaces, and an insulation material layer having a first and a second surface and four side surfaces;
   the first surface of the casting compound layer forming the first planar surface of the tile and the second surface of the casting compound layer being adjacent to the first surface of the insulation material layer, and
   the first surface of the insulation layer having parallel grooves extending perpendicularly against two of the side surfaces of the insulation layer, and the second surface of the insulation material layer forming the second planar surface of the insulation tile;
   wherein the second surface of the casting compound layer extends partially into the grooves attaching the casting compound layer and the insulation material layer together and leaving a space between bottom of the grooves and the casting material layer forming ventilation channels inside the insulation material layer, and wherein
      the insulation material layer is made of extruded polystyrene (XPS), expanded polystyrene (EPS), polyurethane (PIR/PUR) or phenolic foam, the compression strength of which is at least 10 kPa.

2. The insulation tile according to claim 1, wherein the insulation material layer comprises 1-80 weight-%, 1-50 weight-% recycled extruded polystyrene, expanded polystyrene, polyurethane (PIR/PUR) or phenolic foam material or recycled rubber granules.

3. The insulation tile according to claim 1, wherein the insulation tile has a groove on at least one of its side surface in longitudinal direction of the at least one of its side surface.

4. The insulation tile according to claim 1, wherein at least one side surface of the insulation material layer is notched, so that the first surface of the insulation material layer adjacent to the second surface of the casting compound layer is smaller than the second surface of the casting compound layer.

5. The insulation tile according to claim 1, wherein the casting compound layer comprises concrete, or mortar casting compound, which comprises binding agent and inorganic material.

6. The insulation tile according to claim 5, wherein the casting compound layer comprises 1-80 weight-%, 1-50 weight-% recycled extruded polystyrene, expanded polystyrene, polyurethane (PIR/PUR) or phenolic foam material or recycled rubber granules.

7. The insulation tile according to claim 1, wherein the thickness of the casting compound layer is 1-20 mm measured between the first surface of the casting compound layer and between the grooves of the second surface of the casting compound layer.

8. The insulation tile according to claim 1, wherein the second surface of the casting compound layer extending partially into the grooves forms a 2-50 mm thick layer in the grooves above the space on the bottom of the grooves.

9. The insulation tile according to claim 3, wherein the groove on the side surface of the insulation tile is formed between the insulation material layer and the casting compound layer.

10. The insulation tile according to claim 3, wherein the insulation tile has a groove on at least two side surfaces, which side surfaces are substantially parallel.

11. A method to insulate floor, roof or wall structures by installing insulation tiles according to claim 1 onto the structures, which method comprises:
   forming a first planar surface of the insulation tile by providing a casting compound layer on bottom of a mold,
   forming a second planar surface of the insulation tile by providing an insulation material made of extruded polystyrene (XPS), expanded polystyrene (EPS), polyurethane (PIR/PUR) or phenolic foam, the compression strength of which is at least 10 kPa, on top of the casting compound layer, which insulation material layer has parallel grooves on its surface adjacent to the casting compound layer, and wherein the casting compound layer extends partly into these grooves attaching the insulation layer and the casting compound layer together and leaving a space between bottom of the grooves and casting compound layer
   forming parallel ventilation channels inside the insulation material layer.

12. A method for manufacturing an insulation tile, which insulation tile has a first planar surface, a second planar surface and four side surfaces, and which insulation tile consists of a casting compound layer and an insulation material layer, in which method:
   casting compound is fed to a casting mould,
   the insulation material layer is applied to the casting mould on top of the casting compound, which insulation material layer is formed of at least one plate, the compression strength of which plate is at least 10 kPa and is made of extruded polystyrene (XPS), expanded polystyrene (EPS), polyurethane (PIR/PUR) or phenolic foam, and which insulation material layer has parallel grooves on its surface adjacent to the casting compound layer,
   the insulation material layer is pressed against the casting compound, whereby the casting compound is evenly spread to the casting mould forming the first planar surface of the insulation tile and the casting compound partly fills the grooves on the surface of the insulation material adjacent to the casting compound layer forming parallel ventilation channels inside the insulation material layer.

\* \* \* \* \*